Figure 1:
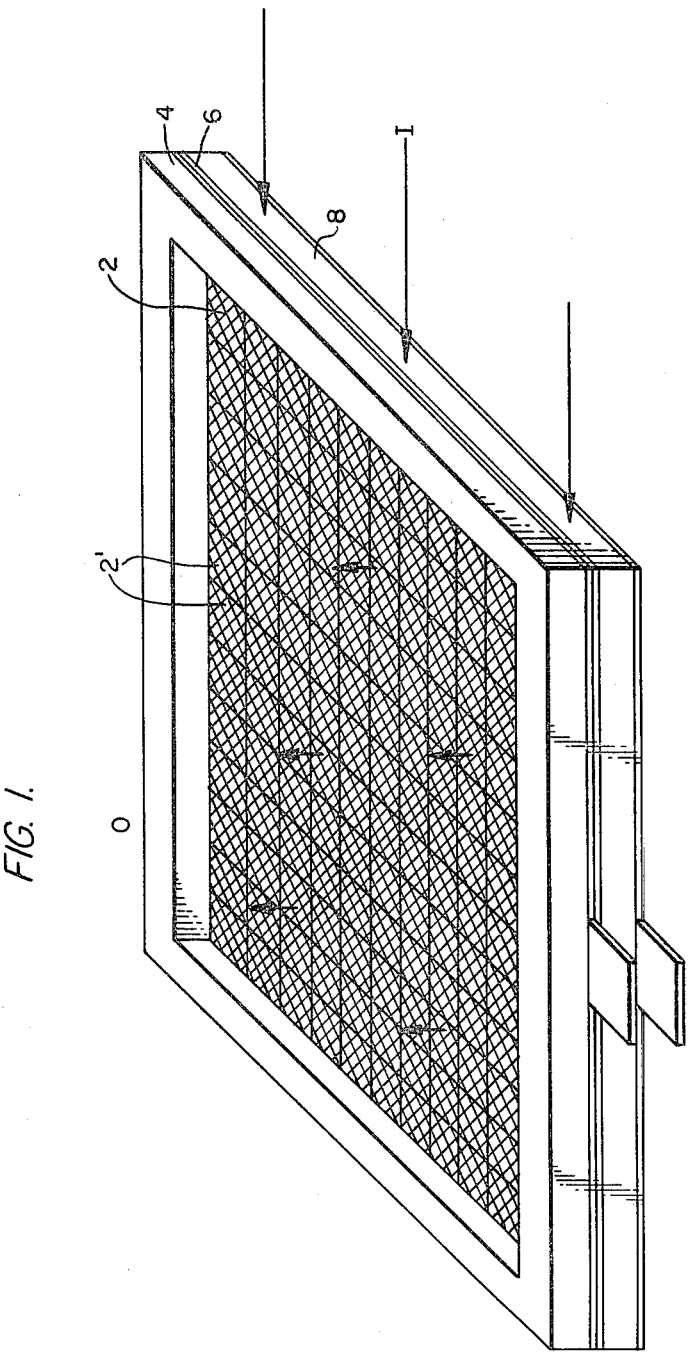

United States Patent [19]

Juda et al.

[11] 4,422,911
[45] Dec. 27, 1983

[54] METHOD OF RECOVERING HYDROGEN-REDUCED METALS, IONS AND THE LIKE AT POROUS CATALYTIC BARRIERS AND APPARATUS THEREFOR

[75] Inventors: Walter Juda, Lexington; Robert J. Allen, Saugus; Robert Lindstrom, Gloucester; Amiran Bar-Ilan, Newtonville, all of Mass.

[73] Assignee: Prototech Company, Newton, Mass.

[21] Appl. No.: 387,963

[22] Filed: Jun. 14, 1982

[51] Int. Cl.³ ............................ C25C 1/12; C25C 7/00
[52] U.S. Cl. ............................. 204/106; 204/105 R; 204/109; 204/248; 204/275; 204/DIG. 3
[58] Field of Search ............ 204/DIG. 3, 105 R, 106, 204/109, 248, 275

[56] References Cited

U.S. PATENT DOCUMENTS

| | | | |
|---|---|---|---|
| 3,793,165 | 2/1974 | Juda et al. | 204/106 |
| 3,993,331 | 11/1976 | Schwarz | 285/53 |
| 4,044,193 | 8/1977 | Petrow et al. | 429/40 |
| 4,059,541 | 11/1977 | Petrow et al. | 252/313 R |
| 4,293,396 | 10/1981 | Allen et al. | 204/106 |
| 4,331,520 | 5/1982 | Juda et al. | 204/105 R |

*Primary Examiner*—R. L. Andrews
*Attorney, Agent, or Firm*—Rines and Rines, Shapiro and Shapiro

[57] ABSTRACT

This disclosure relates primarily to the recovery of hydrogen-reduced metals from aqueous solutions of salts thereof, such as, for example, copper from copper sulphate solution, by hydrogen reduction at a catalytic barrier made pervious to the solution, in an apparatus provided with means to supply hydrogen along a face of said barrier at which the aqueous solution is applied to effect deposition thereupon and flowing the solution transversely through the barrier to continue deposition upon the other face of the barrier.

17 Claims, 2 Drawing Figures

METHOD OF RECOVERING HYDROGEN-REDUCED METALS, IONS AND THE LIKE AT POROUS CATALYTIC BARRIERS AND APPARATUS THEREFOR

The present invention is concerned with hydrogen reduction, at porous catalytic barriers, preferably hydrophobic, of hydrogen-reducible ions in solution, and more particularly, though not exclusively, to the recovery of metals from dilute aqueous solutions of such metal ions at ordinary temperatures.

The term "hydrogen-reducible ion", as used in this specification and the appended claims, means an ion producing a positive potential when it is reduced in aqueous solution in the electrochemical reaction in which hydrogen gas goes to hydrogen ion, i.e. $H_2 \rightarrow 2H^+ + 2e$; that is, the reduced ion has an oxidation potential below that of hydrogen. Recoverable metal ions yielding "hydrogen-reduced metals" in this reaction, as this term is used herein, include such metals as copper, silver, gold, the platinum metals and the like; whereas partially "hydrogen-reducible ions", include the ferric, mercuric, permanganate and similar ions which are reduced in solution from a higher valence state to a lower valence state without normally being reduced to the metal. Finally, the term "ordinary temperature", as used herein is intended to connote ambient temperatures and above; but in any event, temperatures below about the boiling point of water.

In copending application Ser. No. 088,373, filed Oct. 26, 1979, now U.S. Pat. No. 4,331,520 a process and apparatus for effecting the recovery of hydrogen-reduced metals and the like at hydrophobic catalytic barriers is described based upon the discovery of an unexpected behavior of gas-porous hydrophobic catalytic barriers, void of external electrical connections, when directly contacted by hydrogen gas and an aqueous solution of a hydrogen-reducible metal ion. While porous to the flow of hydrogen which may be applied on one side of the barrier and may thus flow through to the other side, the system of said application involved flowing the aqueous salt-solution along a side of the barrier where hydrogen is present, but not on both sides—the barrier being hydrophobic throughout and thus opaque to the solution so that the reduced metal deposition occurred only on the solution-contacting side of the barrier. Considering, for example, the interesting case of a copper ion solution, such as copper sulphate, the hydrogen-reduced copper is recovered from the side or surface of the solution-impervious barrier exposed to the copper sulphate solution. This reduction and deposition of copper occurs, at ordinary temperatures, in the absence of any external electrical circuit; i.e. "circuitry-free". It has further been found that the buildup of copper on the solution-contacted face is not arrested by the initial layer of copper, but continues to any desired level of removal of said copper from said solution.

While above described with reference to the exemplary illustration of copper metal, this technique has also been found to be useful for the reduction of a partially hydrogen-reducible ion, such as, for example, the reduction of the ferric to the ferrous ion or the mercuric to the mercurous ion, with recovery of the reduced ion either as a deposition on the barrier as in the mercurous case, or in solution, as in the ferric reduction.

We have now discovered, however, that by deliberately providing openings in a catalytic barrier of sufficient size to permit the flow therethrough of the aqueous salt solution, and by contacting both surfaces of said barrier in the said flow-through mode in the presence of hydrogen, hydrogen reduction, and more particularly hydrogen-reduced metal desposition, is made to occur on both surfaces of the barrier in a much simplified process and apparatus. We have further found that, when the hydrogen and the solution are caused to flow in mixed phase along one surface of an openings-provided barrier, and forced at substantially right angles transversely through said openings and spread along the opposite barrier surface, remarkably improved performance is obtained—particularly when said barrier is electrically conducting and hydrophobic—and that this improvement in performance is most striking when dilute metal salt solutions, such as dilute copper-bearing leach solutions of low grade mine and waste dump materials, containing, in general, less than about two grams per liter (2,000 ppm) of copper, and often as little as 50 to 500 ppm, are subjected to this mode of operation under turbulent flow conditions.

An object of the invention, accordingly, is to provide a new and improved process and apparatus for the recovery of hydrogen-reduced metals and ions, employing hydrogen reduction on both sides of catalytic barriers having aqueous salt solution on both sides of solution-permeable openings provided therein.

A further object is to provide such a novel process and apparatus embodying hydrophobic and electrically conducting barriers that are particularly useful for the expedited recovery of metals from dilute aqueous solutions thereof, at ordinary temperatures.

Still another object is to provide a novel catalytic barrier of more general utility, as well.

Other and further objects will be explained hereinafter and are more particularly delineated in the appended claims.

In general, the invention encompasses a process for the recovery of hydrogen-reduced metals and/or ions from aqueous solutions thereof providing a catalytic barrier with openings of sufficient size to permit the flow therethrough of an aqueous salt solution, and contacting both surfaces of said barrier with said aqueous solution in the presence of hydrogen. A startling increase in reduction rate has been discovered when the catalytic barrier is hydrophobic and is provided with openings that are pervious to a dilute aqueous metal salt solution, though the other parts of the barrier surfaces remain hydrophobic, and when hydrogen and the said dilute solution are caused to flow in the above-described flow-through mode, at ordinary temperatures.

In summary, from one of its important aspects, the invention embraces a process for recovering a hydrogen-reduced metal from a dilute aqueous solution of an ionized salt thereof, that comprises, providing a hydrophobic catalytic barrier having electrical conductivity along at least parts of the same and having openings distributed therethrough to render the same pervious to said solution as well as hydrogen, flowing hydrogen and said solution at one surface of said barrier to effect the deposition of the hydrogen-reduced metal upon said surface, forcing the flowing hydrogen and said solution transversely through the barrier openings, continuing hydrogen-reduced metal deposition with turbulence at the opposite surface of said barrier, and continuing said flowing to a predetermined level of removal of said metal from said solution. Preferred and best mode embodiments and details are later presented.

Figure 2:
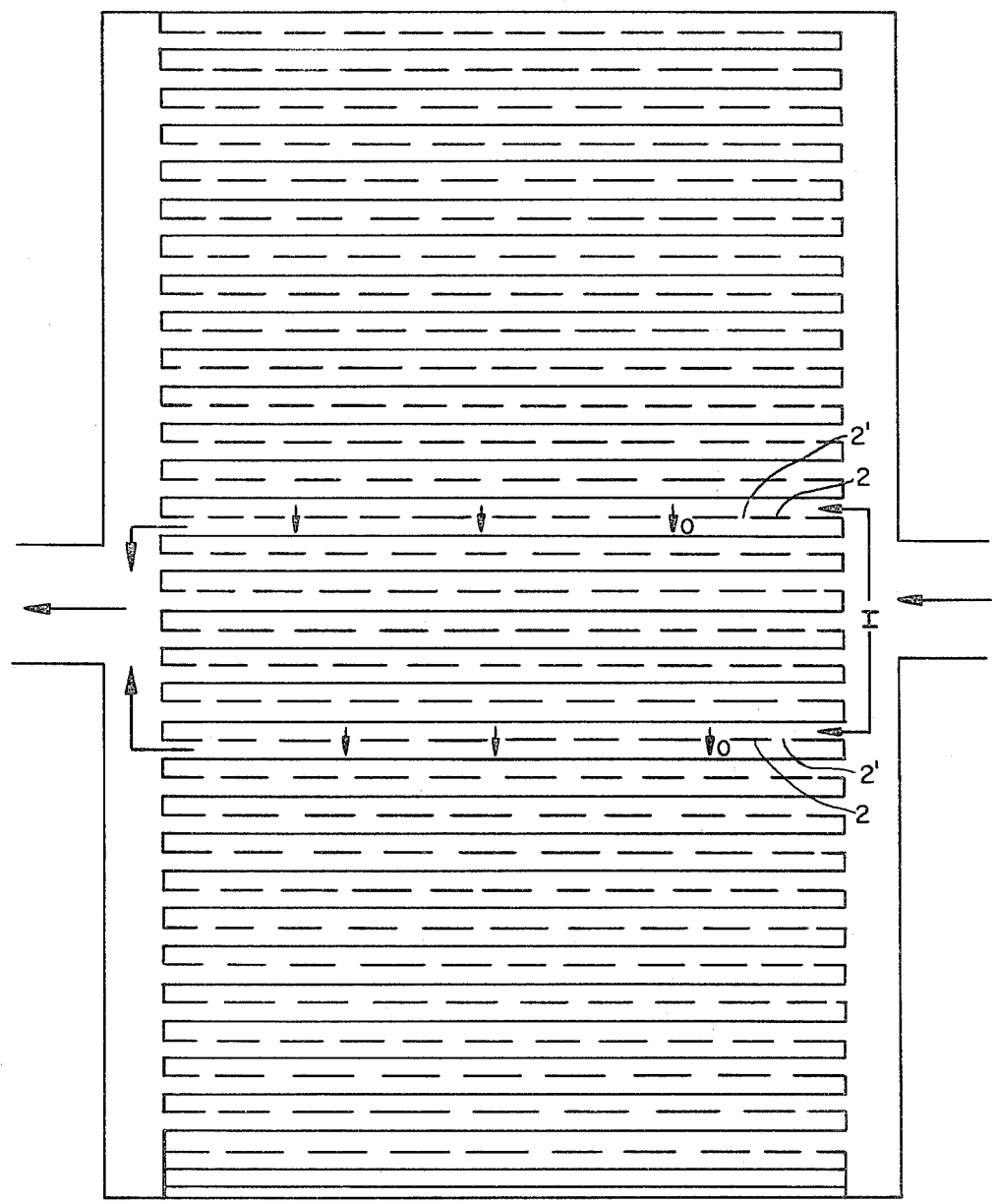

The invention will now be described with reference to the accompanying drawings, FIG. 1 of which is an isometric view of a preferred apparatus for carrying out the process of the invention; and FIG. 2 is a schematic longitudinal section of a modification embodying a manifolded stack of systems such as FIG. 1.

Referring to FIG. 1, a flat or planar hydrophobic catalytic barrier 2 is shown mounted between gasket frames 4 and 6 with the lower side or surface contacting an inlet chamber 8 along which, in accordance with the invention, hydrogen and the metal-ion aqueous electrolyte solution are caused to flow together in mixed phase in the direction of the arrows I. By providing aqueous-solution porous or permeable openings 2' through the otherwise hydrophobic catalytic barrier 2, the solution is forced to flow transversely through the openings in the barrier, as indicated by the vertical arrows O, contacting the opposite or upper side or surface of the barrier, and then outputted.

Deposition thus occurs on the bottom side or surface of the barrier, within the openings 2', and generally along the upper side or surface of the barrier, giving rise to far greater deposition rates than achievable with the technique of said copending application, apparently with inherent turbulence or agitation production through the forced right-angular flow through the barrier.

In general, and in contrast to said copending patent application, suitable catalytic barriers for the purpose of this invention are made pervious to the aqueous salt solution by providing the barriers with openings 2' permitting flow-through of solution. For this purpose, openpore screens, cloths or mats are preferred. By way of example, a loosely-woven open carbon cloth may be selected and catalyzed by coating the yarns thereof with the catalyst alone, or with a catalyst-TEFLON mixture, in such a manner as to retain the openings of the original cloth, though they may have been partially filled by the catalytic coating. Other techniques of providing openings for flow-through are also suitable, including, for example, puncturing, preferably uniformly, the barriers of our said copending application which are impermeable to aqueous solutions or puncturing other catalytic barriers to render them suitable for flow-through.

In general, the size of the opening may be varied depending upon such factors as the nature and concentration of the reducible ion, the flow rate and other operating conditions. In, typically, copper deposition from dilute solutions, as copper is continuously deposited on both sides of the barrier, the size of the openings is gradually decreased thereby causing a gradual increase in pressure drop, and eventually, a blockage of the opening with, for example, deposited copper. Underlying the selection of an initial open barrier is concern for an economical metal (such as copper) loading per unit barrier area (e.g. 0.1–1.0 lb/sq ft) up to an acceptable level of pressure drop increase vs. initial opening size. We have found that initial openings in the range of about 0.05 mm and about 1.0 mm in diameter are advantageous, though smaller and larger openings are also workable.

Suitable noble metal catalysts for the hydrogen ionization reaction include platinum catalysts, preferred because of their corrosion resistance and durability. In particular, the platinum catalysts having a particle size substantially between 15 Å and 25 Å when deposited on finely divided high surface area carbon carriers, (herein referred to as 15–25 Å platinum-on-carbon catalysts) as described, for example, in U.S. Pat. Nos. 3,993,331, 4,044,193 and 4,059,541 of common assignee herewith, have been found to be especially effective in amounts between 0.05 and 0.5 g/sq. ft. of barrier, in catalyzing the hydrogen ionization reaction at ordinary temperatures.

The hydrogen-ionizing catalyst is preferably deposited, together with a hydrophobic or wet-proofing agent such as a fluorinated hydrocarbon polymer (herein referred to as TEFLON), paraffin or the like, on an electrically-conducting porous substrate with openings sufficient in size to retain their flow-through character after catalyst deposition, such as a metal screen, and, especially an open weave carbon yarn cloth, such as the KFB carbon cloth (made by the Stackpole Carbon Company).

The resulting barrier has the structure of a hydrogen electrode, even though the hydrogen reduction thereon is carried out in the absence of an external electrical circuit. It is often advantageous to use such a barrier in the case of, for example, copper recovery because the copper deposited on the barrier can then be removed from the barrier by an electrolytic process, such as in a copper refining cell in which the copper-covered barrier is used as the anode.

As another example the recovery of silver from, for example, a silver nitrate solution can benefit similarly from the use of barriers of such carbon-based substrates.

For other applications, as explained in said copending application, electrically insulating gas-porous substrates, such as a porous ceramic, a glass cloth, or a porous glass fiber mat, are also suitable substrates for the illustrative platinum-on-carbon-TEFLON mixture (or other catalyst hydrophobic mixture) uniformly deposited thereon, so long as, for the purpose of this invention, the barrier is provided with openings for flow-through, either by selecting open weave cloths or by post-puncturing, since the reduction of the present invention, as before stated, takes place in the absence of external circuitry. When, for example, copper is deposited on such a barrier from a dilute copper sulphate solution, it can then be removed from the barrier by contacting the coppered barrier with a small volume of a solution of sulfuric acid and contacting the gas face with air or oxygen, whereby the oxidation and subsequent dissolution of the copper into the acid is catalyzed again at ordinary temperatures, by the platinum catalyst of the barrier. The copper removed from the barrier into the small volume of solution has now been concentrated many fold over the original dilute solution, thereby constituting a suitable feed for conventional electrowinning of copper or the method of U.S. Pat. No. 3,793,165 of common assignee herewith.

The removal of, for example, copper by anodic redissolution (refining) or by oxidation, can be carried out by keeping the barrier in a fixed position and alternating (1) the flows of dilute and concentrated solutions and (2) the flow of hydrogen and D.C. current or air, respectively. When, however, a flexible cloth-based barrier is used, the barrier may conveniently be continuously moved from the dilute hydrogenated solution to effect copper deposition on said barrier, to, for example, a tank containing concentrated solution to effect copper removal therefrom, as above explained.

The metal deposited on the barrier, if the barrier substrate is combustible, as in the case of the beforementioned carbon cloth, may be removed by incinerating the same. In this case, it may be advantageous to use a non-hydrophobic barrier, or a hydrophobic barrier with a non-fluorinated wet proofing agent, such as paraffin, to avoid fluorine-containing fumes during incineration.

The recovery of platinum metals, especially of platinum and palladium, which are excellent catalysts for the $H_2 \rightarrow 2H^+ + 2e$ reaction, is advantageously carried out on a barrier which bears a platinum-on-carbon-wet proofing agent mixture or a palladium-on-carbon-wet proofing agent mixture, respectively. There is then built up on said barrier, by the hydrogen reduction of this invention, a deposit of platinum or palladium, respectively, in amount far in excess of the initial amount present on said barrier. In view of the high price of platinum and palladium, by comparison with the cost of carbon and, typically, paraffin as the wet proofing agent, simple incineration of the barrier which yields directly the recovered platinum or palladium, respectively, as the residue, is quite economical.

Scraping or other mechanical stripping is also useful in some instances.

In the absence of agitation of the aqueous solution, the rate at which the hydrogen-reduced metal, for example, copper, is deposited on the barrier is diffusion-controlled. Thus, in the case of metal recovery from dilute solutions, the apparatus of this invention is provided with turbulence-promoting means causing the solution to be agitated by its flow through the barrier under rapid flowing conditions and/or by turbulence promoters built into the barrier.

As further pointed out in said copending application, the initial deposit of copper on the catalytic platinum of the barrier does not hinder the continued reduction and deposition of copper thereon, as is evidenced by the fact that the reaction can be nearly brought to completion (i.e. to 95% copper removal) at the end of a few hours. This finding is indeed surprising since metallic copper is not a catalyst, at ordinary temperatures, for the reaction $H_2 \rightarrow 2H^+ + 2e$ and the initial copper layer would have been expected to arrest the reaction after covering the catalytic platinum of the barrier. One conceivable explanation for this unexpected behavior is the existence of what might be termed a shorted electrochemical fuel cell couple of a hydrogen-on-platinum anode and a metallic copper cathode wetted by copper ion-containing electrolyte. This effectively shorted couple continues to function so long as the barrier is wetted by the electrolyte containing some dissolved copper ions. Whatever the explanation, however, it is observed in practice that the reduction and the resulting build-up of copper continues up to nearly completion, if desired. This phenomenon, of course, makes the method most useful in the recovery of copper and like metals.

In accordance with the present invention, the hydrogen reduction is carried out at ordinary temperatures, on both surfaces of the barrier by feeding the hydrogen gas into the aqueous salt solution, and flowing the resulting mixed phase into and through the barrier. Alternately, hydrogen may be dissolved in the aqueous salt solution external to the barrier and the hydrogen-laden solution is then subjected to the reduction on the barrier in the flow-through mode.

In general, the tests of Examples described herein were conducted at ambient temperature (20° C.±5° C.), unless otherwise stated (Example 9.).

In contrast to the said copending patent application, the flow-through mode permits the use of non-hydrophobic barriers, as illustrated in the following Example 1.

EXAMPLE 1

A KFB flow-through barrier was prepared by soaking a 58 cm$^2$ sample (weighing 1.59 g) of a standard KFB Carbon Cloth (made by the Stackpole Fibers Company), about 10 mils thick, having 12-14 yarns/inch in each of the warp and fill directions, and openings of about 1 mm in diameter, before catalyzation, in a dilute solution of Pt sol (containing 19 mg Pt/ml) made in accordance with the beforementioned U.S. Pat. No. 4,044,193; the wet sample (weighing 3,568 g) was dried at 190° C. and the platinum compound was reduced to platinum metal under hydrogen at 500° C. The platinum loading of the provided barrier was 0.66 mg/cm$^2$ and its openings ranged from about 0.5 mm to about 1.0 mm. The performance of this construction in accordance with the process of the invention is later presented (TABLE I).

An example of a suitable hydrophobic barrier for the purposes of the invention is presented in Example 2.

EXAMPLE 2

A platinum-on-carbon sample was prepared substantially in accordance with Example 1, col. 9 of said U.S. Pat. No. 4,044,193, the pH being adjusted to 3 during the preparation. The air-dried material, containing 9.9% by weight of platinum on Vulcan XC-72 carbon, which carbon has a high surface area of approximately 200 m$^2$/g, was compounded with 50% by weight of wet-proofing fluorinated hydrocarbon, herein referred to as TEFLON, whereby a typical catalytic carbon-TEFLON mixture was formed. In this example, 1.0 gram of platinum-on-Vulcan carbon was suspended in 60 ml of distilled water containing 1.4 g/l of lanthanum sulphate. The suspension was ultrasonically dispersed and 11.75 ml of the aqueous colloidal TEFLON dispersion described in col. 1 lines 35-44 of U.S. Pat. No. 4,166,143, containing 85 g/l, was added and the stirring was continued for 5 minutes, whereby the TEFLON was completely flocced, forming the uniform catalytic carbon-TEFLON mixture. The floc-containing liquid suspension was then filtered, leaving, on the filter, the mixture in a form of a paste suitable for coating the substrate. The coating procedure consisted in applying the paste to the above-described KFB Carbon Cloth, the paste being spread uniformly on the surface and partially into the open pores of the cloth. The coated fabric is then heated to 340° C. for about 20 minutes. The resulting electrode-type structure had a platinum loading of 0.14 mg/cm$^2$ of electrode area, the platinum being in the form of particles predominantly in the 15-25 Å range, and openings ranging in size between about 0.1 mm and about 1 mm.

The performances of the barriers of Examples 1 and 2 in the process of the invention were compared in tests conducted in a 2" diameter (i.d.) glass pipe column with the flow-through barrier clamped horizontally. One liter of a copper solution containing 0.3 g/l Cu$^{++}$ at pH=2, as sulphate, was recirculted upflow through the barrier at a rate of two liters/minute, for given periods of time, and the copper deposition was determined by analysis of samples of solution removed at various time intervals. The results are shown in TABLE I.

TABLE I

| Barrier of | Hydrophobic | Barrier Loading mg/cm² Pt | Time of Test in minutes | mg. Pt Plated |
|---|---|---|---|---|
| Example 1 | No | 0.66 | 90 | 119 |
| Example 2 | Yes | 0.14 | 105 | 300 |

It is seen that (1) the electrically-conducting, non-hydrophobic barrier of Example 1, while effective, is much less so than the hydrophobic and electrically-conducting barrier of Example 2, especially in view of its higher platinum loading, (0.66 mg/cm² vs. 0.14 mg/cm²); indeed, the conducting and hydrophobic barrier of Example 2, with a Pt loading of only 0.14 mg/cm², is strikingly superior to the other in that it removed substantially all the copper in 105 minutes.

EXAMPLE 3

A flow-through hydrophobic fiber glass-based barrier was prepared by the technique of Example 2, the fiber glass cloth, 10 mils thick, having openings of about 0.5–0.8 mm in size before catalyzation, and about 0.1–0.3 mm in size after catalyzation. The finished barrier had a Pt loading of 0.17 mg/cm².

1.5 liters of a copper sulphate solution containing 0.302 g/l $Cu^{++}$ at pH=2 were recirculated in the above-described 2" diameter test cell with a hydrogen flow rate of 2 liters/minute.

TABLE II shows the copper removal rate.

TABLE II

| Time elapsed in minutes | $Cu^{++}$ in Solution ppm |
|---|---|
| 0 | 302 |
| 10 | 278 |
| 30 | 229 |
| 45 | 194 |
| 50 | 185 |

The test was stopped at the end of 50 minutes because the copper build-up had caused a pressure drop increase from a few inches of water to fluctuations between 10 and 26 inches with $H_2$-flowing, due to the smaller opening size of the barrier compared to that of Examples 1 and 2.

Recovery of the copper or other deposition can be effected by connecting the copper-carrying barrier as an anode and applying a D.C. potential between it and a cathode-starting sheet, in a copper refining cell utilizing for example, a concentrated copper sulphate electrolyte.

By way of example, a barrier, 2 inches in diameter (3.14 square inches), with a Pt content of 0.18 g/sq ft, made in accordance with Example 2, was first loaded to 0.50 lb Cu/sq ft by recirculating through the barrier a copper sulphate solution containing 0.3 g/l $Cu^{++}$ at pH=2.0; at a rate of 2 liters/minute for 16 hours. The dilute copper sulphate solution was then replaced with a concentrated solution containing 10 g $Cu^{++}$/liter and 150 g $H_2SO_4$/liter and recirculated at a rate of 3 liters/minute; the coppered carbon cloth was made anodic and a 50 mil thick perforated copper starting sheet was made cathodic using an anode-cathode spacing of ½ inch; a D.C. voltage of from 0.25 volt initially to 0.35 volt finally was applied causing electrorefining at an anodic current density of 43.8 ASF at room temperature for 220 minutes, when 80% of the copper was removed from the anodic barrier to the cathode. The barrier was now ready for re-use in the copper recovery cycle.

A further important advantage residing in the improvement of the present invention is the relaxing of the pin-hole free stringent and expensive reqirement to insure both gas porosity and liquid hydrophobicity in the electrode structure of the said copending application. Further, the flow-through barriers have been found to have low Pt catalyst loading, for example, less than half that of the latter, while retaining excellent performance.

EXAMPLE 4

Using a copper sulphate aqueous solution with a feed of 0.3 g/l $Cu^{++}$ (pH 2.0), a one liter feed volume, a solution flow rate of 2 liters/minute, a hydrogen flow rate of 650 ml/minute, directed as shown in FIG. 1 along a surface of a 20 square centimeter barrier 2 of the open-weave KFB Carbon Cloth (Stackpole) barrier of Example 2, having weave openings 2' predominantly in the range about 20 mils to about 50 mils, distributed in about 140 openings/inch², and coated with said 15–25 Å platinum particles and TEFLON, as described in Example 2, the following results were obtained:

| Elapsed Time | g/l $Cu^{++}$ (Depletion of Cu from Solution) |
|---|---|
| 0 | 0.300 |
| 15 mins. | 0.237 |
| 45 mins. | 0.109 |
| 75 mins. | 0.029 |
| 105 mins. | 0.001 |

These results are to be contrasted with deposition rates of one-tenth or less as fast for substantially equivalent runs with the technique of said copending application using a hydrophobic solution-impermeable carbon cloth barrier as of PWB-3 (gas porous, but of tight weave, i.e. hole-free), similarly treated with said platinum particles and TEFLON.

In general, the metal deposition rate is affected by the amount of copper previously loaded onto a barrier. By way of example, the hydrophobic barrier made in accordance with the method of Example 2, having a Pt loading of 0.14 mg/cm², was loaded to a level of 5 g Cu per 2 inch diameter barrier (i.e. per 3.14 inch²), or 0.5 lb Cu/sq ft of barrier. Initially, with the "fresh" barrier, it required 66 minutes to load 300 mg of Cu metal onto the barrier, by recirculating 10 liters of $CuSO_4$ solution containing 300 ppm $Cu^{++}$ through the barrier, at ambient room temperature. After 1,800 mg (i.e. 0.30 lb/sq ft) had been deposited on the barrier, it required then 270 minutes to load an additional 300 mg onto that same barrier from the same 10 liters of 300 ppm solution.

Thus, in any practical operation, it is important to balance the metal deposition rate to a predetermined level of total loading vs. the frequency of metal removal from the barrier at various levels of metal concentration in solution. Clearly, counter-current staging is indicated, such as sucessive stages of the hereinafter embodiment of FIG. 2, which consists in contacting, in a first stage, the most concentrated metal salt solution (for example, copper salt solution) with a barrier having deposited copper thereon in amount approaching the final load limit, and having the most dilute copper salt solution in contact with an (almost) copper-free barrier in the last stage. Note that it may be desireable to retain small amounts of copper on the barrier when conventional electrorefining is used for copper cathode production, preferably within the same stage. Here, after final copper loading, the first stage may be removed from the recovery cycle, subjected to electrorefining, followed by cathode copper removal. Upon reassembly with a new cathode starting sheet, this stage may now be inserted into the recovery cycle as the last stage.

In addition to hydrophobicity, major factors affecting the rate of copper deposition and a practical limit of copper loading on the barrier including the catalytic platinum loading and the "openness" of the barrier. All other things being equal, (i) a low Pt loading will result in a lower copper load limit than a higher Pt loading, said limit to be determined by an excessive slowing of the deposition rate; and (ii) a "very small" pore barrier will cause pressure drop increases which can become excessive for practical purposes.

By way of example of the affect of Pt loading, two identical carbon cloths (A and B) were catalyzed in accordance with the method of Example 2, A to a level of 0.14 mg Pt/cm$^2$ and B to a level of 0.09 mg Pt/cm$^2$. In the test conducted in the above described 2 inch diameter cell, barrier A could be loaded up to 5.0 grams Cu per 3.14 square inch in 2100 minutes before the deposition rate slowed excessively, whereas barrier B was limited to 1.25 grams Cu per 3.14 square inch in 600 minutes when the slow-down occurred.

Reasonable limits of barrier loadings are in the range of about 0.1-1 lb/sq ft, more or less, for copper and other metals removed by the process of this invention.

In the flow-through mode of operation, the extent to which copper or like metal can be loaded onto the barrier, before causing an excessive pressure drop can be controlled within reasonable limits by an appropriate choice of the size of the barrier openings as illustrated in Example 5.

EXAMPLE 5

A flow-through barrier C was prepared from a KFB Carbon Cloth, 10 mils thick, and having, before catalyzation, 12-14 yarns/inch in each of the warp and fill directions, with openings of about 1 mm in diameter. After catalyzation in accordance with the procedure of Example 2, the barrier openings ranged between 0.05 and 0.2 mm and the barrier averaged about 20 openings/cm$^2$ and had a Pt loading of 0.15 mg/cm$^2$. A flow-through barrier D was prepared from the same carbon cloth as barrier C. After catalyzation in accordance with the procedure of Example 2, but with significantly less Pt-on-carbon catalyst, the barrier averaged about 35 openings/cm$^2$ and the Pt loading was 0.09 mg/cm$^2$.

Barriers C and D were loaded with copper in the above described 2 inch diameter cell using the copper sulphate solution of Example 2. Barrier C showed substantial erratic pressure drops up to 14 inches of H$_2$O after loading to about 1.8 g Cu/3.14 sq inch thereon, whereas barrier D showed no significant increase in pressure drop up to about the same copper loading.

The following examples illustrate the use of the process of the invention with exemplary noble metals and a typical metal ion.

EXAMPLE 6

In a system like that of FIG. 1 using 3 liters of an aqueous platinum-palladium chloride solution of pH 3.0 (75 mg/l platinum; 25 mg/l palladium), with the same type of barrier as in Example 2, 20 square centimeters in area, a two liter/minute solution flow rate and 625 ml/minute hydrogen flow rate, 100 mg of platinum and palladium were deposited in 25 minutes; whereas only 22 mg were deposited under substantially the same conditions in 120 minutes by the process of said copending application—i.e. about five times the amount of deposition in about one-fifth the time through the use of the present invention.

In this instance, it was observed that small amounts of platinum and palladium metal deposited in the recirculating system of a reservoir tank and plastic tubes to and from the tank. As Pt and Pd are catalysts for the hydrogen reduction process, the system appears to be unstable in that dissolved hydrogen in the electrolyte can trigger the reduction, either in the practical absence or in the presence of minute amounts of Pt or Pd metal catalyst. As it is desireable to localize the recovered Pt and Pd metals, this problem can be minimized by injecting small amounts of air (or oxygen) into the electrolyte solution, after passage through a first barrier, and then passing the O$_2$ and H$_2$-containing electrolyte solution through a second catalytic barrier to effect the H$_2$ elimination thereon by combination with the oxygen.

EXAMPLE 7

2 liters of a silver nitrate solution containing 0.492 g/l of Ag$^+$ (pH=3) was recirculated at a rate of 2 liters per minute in the above-described 2 inch diameter test cell with a hydrogen flow rate of about 625 cc/minute, using the barrier of Example 2. More than 99% of the silver was deposited on the barrier in 25 minutes, as determined by analysis of the solution. At the end of 35 minutes, the barrier was removed, dried and weighed, giving a deposit of grayish-white silver of 0.985 grams.

EXAMPLE 8

One liter of an iron sulfate solution containing 1 gram Fe$^{+++}$/l and 2.2 grams Fe$^{++}$/l, at pH=2, was subjected as in Example 7. At the end of 60 minutes, the concentration of Fe$^{++}$ had risen to 3.2 g/l, while that of Fe$^{+++}$ was substantially zero.

EXAMPLE 9

The recovery of gold by hydrogen reduction from a cyanide solution in which, for example, univalent gold is in the form of the very stable strong KAu(CN)$_2$ complex, is considerably slower than that of a non-complexed or weak gold complex. Nevertheless, the process of this invention results in adequate reduction rates of the strong complex at moderate temperatures, above ambient as illustrated in the following: 2 liters of a KAu(CN)$_2$ solution in KOH at pH=11, containing 0.3 g Au/l, was recirculated at a rate of 2 liters/minute and at a temperature of 60° C. through the barrier of Example 2, as in Example 7. At the end of 60 minutes 40 mg of gold were deposited on the barrier.

In actual practice, the cells of FIG. 1 may be replicated and stacked in parallel, as shown in manifold M, FIG. 2, for simultaneously feeding of the mixed phase hydrogen and salt solution.

Further modifications and uses with other metals and ions will suggest themselves to those skilled in this art and are considered to fall within the spirit and scope of the invention as defined in the appended claims.

What is claimed is:

1. A process for recovering hydrogen-reduced metals or ions from an aqueous electrolyte solution thereof, that comprises, providing a catalytic barrier having openings distributed therethrough to render said barrier pervious to said solution, applying hydrogen to said barrier and flowing the solution transversely through the barrier openings while contacting both surfaces of said barrier by the solution.

2. A process as claimed in claim 1 and in which the hydrogen and solution are caused to flow in mixed phase along one surface of said barrier, are forced at substantially right angles transversely through said barrier openings and spread along the opposite barrier surface.

3. A process as claimed in claim 2 and in which the solution comprises an ionized salt of said metal and said hydrogen-reduced metal is deposited on both surfaces of said barrier.

4. The process of claim 3 in which said metal is copper.

5. A process as claimed in claim 3 and wherein said barrier is hydrophobic and electrically conducting, said solution is a dilute solution of said salt and said flowing is carried out with turbulence and continued to a predetermined level of removal to said metal from said solution.

6. A process as claimed in claim 1 and in which said process is effected simultaneously along a stack of substantially parallel manifolded barriers.

7. A process as claimed in claim 4 and in which the copper covered barrier is connected as an anode in an electrorefining cell to recover the deposited metal as cathodic copper.

8. A process as claimed in claim 3 and in which said solution is selected from the group consisting of copper and noble metals.

9. A process as claimed in claim 1 and in which the solution comprises an ionized salt of a partially hydrogen-reducible ion.

10. A process as claimed in claim 1 and in which said barrier is hydrophobic.

11. A process as claimed in claim 1 used in successive counter-current stages with successively less concentrated salt solutions.

12. Apparatus for recovering a hydrogen-reduced metal from an aqueous solution of an ionized salt thereof having, in combination, a hydrophobic catalytic barrier having electrical conductivity along at least parts of the same and provided with openings distributed therethrough of size sufficient to render the same pervious to said solution in addition to being otherwise hydrophobic; and means for flowing hydrogen and said solution in mixed phase along one surface of said barrier and forcing the same transversely through the barrier openings further to flow turbulently along the opposite surface of said barrier.

13. Apparatus as claimed in claim 12 and in which a plurality of said barriers are stacked in a manifold with said flowing means simultaneously feeding said mixed phase of hydrogen and said solution along one surface of each barrier, through each barrier and out after contacting the opposite surface of each barrier.

14. Apparatus as claimed in claim 12 and in which said barrier is of carbon cloth loosely woven to provide said openings and coated with noble metal particles and a wet proofing agent.

15. Apparatus for recovering from aqueous solutions hydrogen-reduced metals and for similar uses, comprising a hydrophobic catalytic barrier electrically conductive along at least parts of the same and provided with openings distributed therethrough of size sufficient to render the same pervious to solutions and otherwise being hydrophobic.

16. Apparatus as claimed in claim 15 and in which said barrier comprises carbon cloth loosely woven to provide said openings.

17. Apparatus as claimed in claim 16 and in which platinum particles and a wet proofing agent are coated upon said barrier.

* * * * *